United States Patent [19]

Kumagai et al.

[11] 4,141,063
[45] Feb. 20, 1979

[54] VEHICLE HEADLIGHT BEAM ADJUSTING DEVICE

[75] Inventors: Kimio Kumagai, Isehara; Tatuo Nakamura, Tokyo; Harutoshi Tsujimura; Masao Ishikawa, both of Yokohama, all of Japan

[73] Assignees: Nissan Motor Co., Ltd., Yokohama; Ichikoh Industries Limited, Tokyo, both of Japan

[21] Appl. No.: 799,788

[22] Filed: May 23, 1977

[30] Foreign Application Priority Data

May 24, 1976 [JP] Japan .............................. 51-65274[U]

[51] Int. Cl.² .......................... B60Q 1/06; F21M 3/18
[52] U.S. Cl. ...................................... 362/425; 362/40; 362/233
[58] Field of Search ........................ 362/40, 66, 68, 70, 362/233, 420, 424, 425, 428, 225

[56] References Cited

U.S. PATENT DOCUMENTS

| | | | |
|---|---|---|---|
| 1,453,281 | 5/1923 | Persons | 362/40 |
| 1,494,500 | 5/1924 | Parker et al. | 362/233 |
| 2,605,388 | 7/1952 | Theisen | 362/233 |
| 4,045,666 | 8/1977 | Stringer | 362/233 |

Primary Examiner—J. D. Miller
Assistant Examiner—Peter S. Wong

[57] ABSTRACT

To vary the angle at which the headlight beams are directed only road surface from within the passenger compartment of a moving vehicle, spring forces urging hinged headlight mounting frames foreward are matched by the force of a spring assisting a winder to urge, via a first cable, lever, second and third cables, the frames in the opposite direction such that the force required to move the frames in either direction via a knob in the passenger compartment is substantially that required to move the frames if they were hanging or otherwise under the influence of only their own weight.

1 Claim, 3 Drawing Figures

VEHICLE HEADLIGHT BEAM ADJUSTING DEVICE

BACKGROUND OF THE INVENTION

1. Field of the Invention

This invention relates to the headlights of a motor vehicle and more particularly to a device for adjusting the angle at which the light beams emited from the headlights are directed down onto the surface of the road, from within the vehicle.

As is well known the headlights of motor vehicle are usually adjusted and set to preset standards. These standards are however a compromise between providing the maximum amount of illumination of the road ahead of the vehicle and preventing blinding of a driver of an oncoming vehicle. The provision of high and low beams are a boon to the solution of this problem but still it is desirable to be able to vary the angle at which the light beams are directed down onto the surface of the road in conjunction with often suddenly varying driving conditions. For example if driving in the mountains at night in relatively clear weather and at relatively high speeds and encountering a snow storm, rain or heavy fog, to be able to reduce the distance at which the light beams converge ahead of the vehicle without the troublesome time consuming readjustment of headlights, which usually requires specialized equipment, is highly desirable. Similarly if a relatively heavy weight is placed in the trunk or boot of a sedan or the like, to be able to compensate for the sudden elevation of the light beams to prevent dangerous blinding of the driver of an oncoming vehicle is of course also highly desirable.

2. Description of the Prior Art

Thus it has been proposed that the headlights of the motor vehicle be hingedly or pivotably mounted at the front of the vehicle and the angle at which the light beams directed at the surface be controlled by an apparatus installed in the vehicle.

One apparatus proposed for controlling the afore mentioned angle involves a complex electronic apparatus which senses various parameters such as the longitudinal inclination of the vehicle due to a change in the weight distribution and or the addition or removal of a relatively large amounts of weight. However this apparatus has in general lacked in flexibility especially when sudden changes of weather are concerned.

A more practical apparatus has been also proposed which controls the beam angle via the use of a plurality of wire cables and a tension controlling device connected to the cables. This has solved the problems encountered by the electronic controller but has suffered from the drawback of being very easy to adjust in one direction but extremely difficult to adjust in the other. Not only that but due to stretching of the cables and general wear the apparatus has been unable to maintain symmetrical focusing of the two or two sets of headlights.

Thus there still remains a need to provide a simple device of the nature just described but which is easily adjustable in both directions thereby preventing the driver from overtaxing him or herself, while adjusting the beam angle, to a point where insufficient attention is given to driving of the vehicle and which effectively maintains symmetrical alighnment of the beams.

SUMMARY OF THE INVENTION

In order to satisfy the afore mentioned need a simple and effective device for controlling the angle at which the beams from the headlights strike the surface of the road has been developed which comprises a winder, mounted so the control knob of same is exposed to the interior of the passenger compartment of the vehicle and which is connected via a first cable to one end of a lever rotatably mounted at the front centre of the vehicle body just rear of the grill. Two other cables which are connected at equidistant points to the lever are in turn connected to hinged headlight mounting frames via pulleys so that retraction of the first cable induces the headlight mounting frames to swing against the biasing force of springs mounted behind the frames toward the rear of the vehicle, thereby lowering the headlight beams.

The operation of the above being characterized by the winding effort required to raise and lower the light beams being substantially equal and relatively small because the biasing force of the springs mounted behind the headlight mounting frames urging the frames toward the front of the vehicle being balanced by a spring disposed in the winder which urges the first cable in a direction opposite to that induced by the springs mounted behind the headlight mounting frames, and the relatively small frictional losses incurred by the system.

OBJECTS OF THE INVENTION

It is therefore an object of this invention to provide a vehicle headlight beam adjusting device which is simple in design undergoes little frictional loss and which equalises and minimizes the manual effort to raise and lower the headlight beams.

It is also an object of this invention to provide a vehicle headlight beam adjusting device which after prolonged use still maintain a symmetrical focusing of the headlight beams on the surface of the road.

A BRIEF DESCRIPTION OF THE DRAWINGS

Other objects features and advantages of this invention will become more apparent as the description proceeds taken in conjunction with the appended drawings in which.

DETAILED DESCRIPTION OF THE PREFERRED EMBODIMENT

Figure 1:
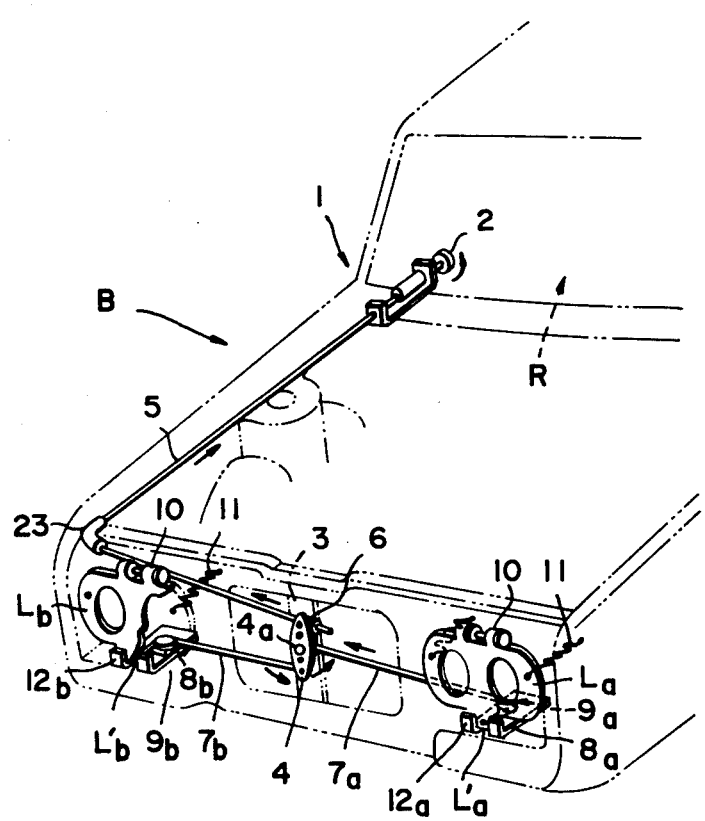
FIG. 1 is a schematic view showing the arrangement of the vehicle headlight beam adjusting device according to this invention operatively mounted in a motor vehicle.

As seen in FIG. 1 a vehicle headlight beam adjusting device is disposed in a vehicle body generally denoted by the letter B which has a passenger compartment R. A tension controlling winder 1 is disposed so as to expose the control knob 2 thereof to the interior of the passenger compartment thus to be manipulable by an occupant, preferably the driver, seated therein.

A cable 5 preferable made of steel wire, or any other suitable material, is shown connected at one end to the tension controlling winder or winder 2, as it will referred to from hereinafter, and at the other end to one end of a lever 4 mounted at substantially the mid point of the front of the vehicle. As shown the cable 5 passes through a short bent tube 23 disposed at the front corner of the vehicle body B as shown to redirect the cable appropriately toward the lever 4. The lever 4 is pivotably mounted about a point 4a which is substantially as the mid point of the lever. Connected equidistantly from the mid point 4a are two similar cables 7a and 7b. These cables are each connected to light bodies or light mounting frames La and Lb respectively. Each of the frames are mounted via hinges 10a and 10b formed at the top thereof to the vehicle body B. Also fixedly mounted on the vehicle body are a pair of brackets 8a and 8b. These brackets are arranged, as shown to extend horizontally so that retaining flanges 12a and 12b are engagable with the light mounting frames La and Lb respectively if the said frames swing toward the front of the vehicle body beyond a predetermined degree. Disposed between the vehicle body and the light mounting frames are springs 11 which bias the frames into engagement with the retaining flanges. Connected of the frames at points designated by La' and Lb' are the cables 7a and 7b which as shown are passed around substantially horizontal pulleys 9a and 9b each of which are respectively mounted on the horizontally extending brackets 8a and 8b. (It is to be noted that in this case horizontal is defined by the plane defined by the longitudinal axis and the transverse axis of the vehicle body B)

Figure 2:
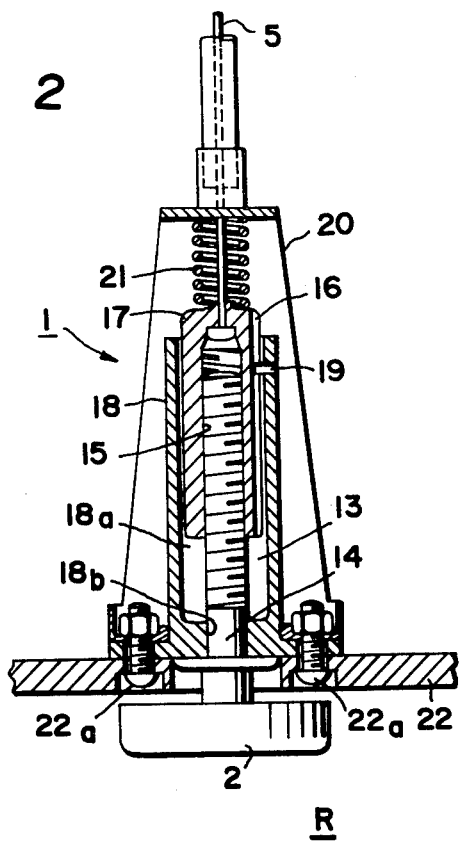
FIG. 2 is a longitudial sectional view of a tension controlling winder of the headlight beam adjusting device of this invention.

FIG. 2 shows details of the construction of the winder 1 wherein the numeral 20 denotes a bracket which has a channel shaped longitudinal cross section. 18 denotes a tubular member which as clearly shown in FIG. 2 is fastened via bolts 22a along with the bracket 20 to a dash panel 22. Slidably arranged in the tubular member 18 is a slide nut 17 which has a bore formed therein parallel to and coincident with the longitudinal axis thereof. A female thread 15 is formed on the inner surface of the bore which as shown is interthreaded with a male thread formed on the outer surface of a shaft 14. The shaft 14 passes through a hole 18b formed in the tubular member 18 and through a hole (no numeral) which is formed so as to be coaxially aligned with the hole 18b in the dash panel. Fixedly connected to the end of the shaft projected into the passenger compartment R is the knob 2. A pin 19 passed through the side of the tubular member 18 is arranged to slidably engage a slot or guide recess 16 formed in the side of the slide nut 11 so as to prevent the rotation of the slide nut within the tubular member. Disposed between the end of the slide nut 17 and the end of the bracket 20 is a compression spring 21 through the centre of which the cable 5 passes to enter a hole communicating with the bore formed in the slide nut 17 and be fixed in the bores as shown or by any other suitable means. If desired the first cable 5 may be fixed to the end of the slide nut 17 by suitable means.

Figure 3:
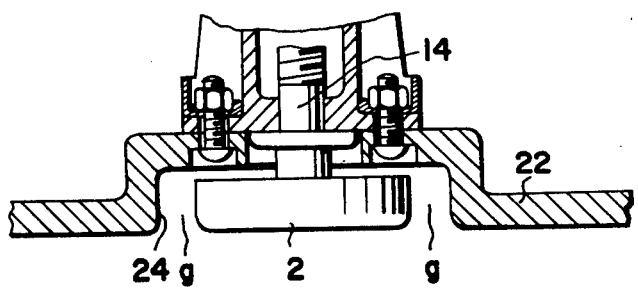
FIG. 3 is a partial view similar to that of FIG. 2 but showing the control knob of the winder recessed into the dash panel of the vehicle.

FIG. 3 shows a preferred arrangement of the knob wherein as shown it is recessed into the dashpanel or instrument panel to be flush therewith. The reason for this is to protect the driver from injury in case of collision which might accidentally throw him or her against same. The recess 24 in which the knob 2 is disposed is so constructed that the gap "g" is such that a driver can easily insert his or her fingers into same and easily and unobstructedly rotate the knob to vary the angle at which the light beams from the headlights strike the surface of the road.

OPERATION OF THE PREFERRED EMBODIMENT

In operation the afore described apparatus functions as follows: when the winder knob 2 is rotated to simultaneously rotate the shaft 14 the slide nut 17 threadably engaged with the shaft is urged either away from or toward the winder knob 2. It will be noted that the pin 19 slidably engages in the slot or guide recess 16 prevents the rotation of the slide nut within the cylindrical member 18. The threads on the shaft 14 and in the bore formed in the slide nut 17 may be selected so that clockwise rotation of the knob 2 will urge the slide nut either away from or toward same depending on ergonomical considerations (i.e. the location and the ease of use in that position).

When the slide nut 17 is urged toward the winder knob 2 the cable 5 is retracted in a similar direction. The spring 21 is so selected as to assist the movement of the slide nut in the direction of the knob thus reducing the effort in turning the knob in the direction to achieve the above mentioned movement. The movement of the slide nut is transferred to the lever 4 via the first cable 5 which is slidably passed through a short tube 23 bent generally at right angles. If desired this tube can be replaced by a pulley. The lever as shown in the drawings is rotated in an anti-clockwise direction (as seen from in front of the vehicle) by the retraction of the cable 5. This causes the cables 7a and 7b to be retracted away from the headlight mounting frames in the direction of the lever 4.

Since the cables are, as shown, passed around pulleys 9a and 9b respectively the frames to which the cables are attached are drawn to be rotated about their hinges 10 in the direction on of the rear of the vehicle. However the springs 11 resist this motion of the frames to oppose the force of the spring 21 assisting the motion of the first cable 5 which induces the afore mentioned swinging motion of the headlight frames. Now, according to this invention it is preferred that the biasing force of the springs 11 and the spring 21 be so selected that they are substancially equal. This induces a condition which resembles that which would occur if the frames were hanging free under the influence of only their own weight viz. be very easily swung in either direction.

The retaining flanges are formed on the leading edges of the brackets 8 and function to retain the headlight mounting frames preventing same from excessive forward travel which would direct the beams of light upwardly to an undesirable degree. This has particular merit when and if the cable or cables should break or otherwise fail to maintain the frames in the desired position. It is thus possible according to this invention that the limit to which the forward travel of the frames is permitted is such that in this position the light beams are raised to their maximum practical degree. However the likelyhood of failure is minimized with the simple construction of the preferred embodiment there being very few moving parts which are subjected to stress of any degree.

To facilitate the adjustment of the light beam angle an adjusting nut 6 is locked onto the end of the first cable and arranged to abut the lever 4 as shown. Thus adjustment which is beyond the capacity of the winder 1 is facilitated and is quite easy the adjusting nut being located at the front of the vehicle body making it highly accessable.

CONCLUSION

Thus it will be appreciated from the foregoing description of the construction and operation that the vehicle headlight beam adjusting device according to this invention has few moving parts and very few parts subjectable to abrasion and wear and/or frictional contact with other parts thereby reducing frictional losses inherent in complex systems to a minimum which when combined with the previously described balancing of forces between springs 11 and spring 21 the effort required for adjustment of the angle at which the light beams strike the surface of the road is reduced to the practical limit.

The minimized effort required to perform the above described adjustment reduces the amount the driver is distracted while driving thus reducing to a minimum the possibility that he or she will be dangerously engaged in turning the control knob to the detriment of safe driving. Hence when combined with the recessing of the knob into the dashpanel or instrument panel, eliminates any dangerous characteristics from the invention.

It will be also obvious to those skilled in the art that the construction of the invention is robust conferring on it a long and trouble free life and may simply be inverted so that the hinges 10 be arranged at the bottom of the headlight mounting frames and the cables 7a and 7b connected at upper portions thereof without departing from the spirit and scope of the invention.

Furthermore although shown in the drawings the axis of the hinges need not be parallel to the transverse axis of the vehicle body but may be arranged so that the optimal angle change of the light beams is achieved via movement of the frames via the cables and lever.

What is claimed is:

1. In a motor vehicle having a passenger compartment and a dash panel therein, a headlight beam adjusting device comprising:
   two headlight mounting frames hingedly mounted in a spaced relationship to the front of said vehicle for swingable movement;
   two first spring means for biasing said two headlight mounting frames to swing respectively, in one direction;
   a winder which includes:
      a bracket fixedly connected to said dash panel, said bracket having a tubular section and a wall section;
      an elongate slide nut reciprocatively received in said tubular section and formed with a bore along the longitudinal axis thereof and a longitudinal extending groove along the outer side thereof, said bore being formed with an internal thread;
      an inwardly directed projection mounted in said tubular section which slidably engages said longitudinally extending groove for preventing relative rotation between said slide nut and said tubular section; and
   a rotatable shaft formed with an external thread along a portion thereof and which carries a knob at one end thereof,
      said shaft being disposed through holes formed in said dash panel and said bracket so that said knob is accessible from said passenger compartment and the threaded portion is threadedly received in said bore via said thread formed therein;
   a lever mounted to the front end of said vehicle substantially midway between said headlight mounting frames and arranged to be rotatable about an axis of rotation which is substantially parallel with the longitudinal axis of said vehicle and which intersects the longitudinal axis of said lever at substantially the mid point thereof;
   second and third cables connected at their first ends to said lever at locations equidistant from and diametrically opposed to said axis of rotation and connected at the second ends thereof to said headlight mounting frames respectively at positions near the free edges thereof opposite the hingedly mounted edges;
   a first cable operatively connected at a first end thereof to said slide nut of said winder and at the second end thereof to said lever at a distance from said axis of rotation which is greater than the distance defined between said axis of rotation and one of said equidistant positions; and
   second spring means having one end bearing against said wall section of said bracket and an opposite end bearing against said slide nut for biasing said slide nut against the biasing force of said two first spring means transmitted through said second and third cables, said lever and said first cable.

* * * * *